United States Patent [19]

Schiffino

[11] Patent Number: 5,475,067
[45] Date of Patent: Dec. 12, 1995

[54] PROCESS FOR POLYOLEFIN PRODUCTION USING SHORT RESIDENCE TIME REACTORS

[75] Inventor: Rinaldo S. Schiffino, Kingwood, Tex.

[73] Assignee: Exxon Chemical Patents Inc., Linden, N.J.

[21] Appl. No.: 123,028

[22] Filed: Sep. 16, 1993

[51] Int. Cl.$^6$ .................................................. C08F 2/06
[52] U.S. Cl. .............................. 526/79; 526/86; 526/87; 526/88; 526/351; 526/352
[58] Field of Search ................................. 526/79, 86, 87, 526/88

[56] References Cited

U.S. PATENT DOCUMENTS

| | | | |
|---|---|---|---|
| 2,852,501 | 9/1958 | Richard, Jr. et al. | 260/94.9 |
| 3,625,658 | 12/1971 | Closon et al. | 23/285 |
| 3,681,306 | 8/1972 | Wehner | 260/80.78 |
| 4,026,967 | 5/1977 | Flexman et al. | 260/878 R |
| 4,065,520 | 12/1977 | Bailey et al. | 260/878 B |
| 4,078,133 | 3/1978 | Ozima | 526/80 |
| 4,250,290 | 2/1981 | Peterson | 528/14 |
| 4,311,803 | 1/1982 | Smith et al. | 525/53 |
| 4,540,753 | 8/1985 | Cozewith et al. | 526/88 |
| 4,716,207 | 12/1987 | Cozewith et al. | 526/169.2 |
| 4,736,001 | 4/1988 | Carbonaro et al. | 526/63 |
| 4,786,697 | 11/1988 | Cozewith et al. | 526/88 |
| 4,789,714 | 12/1988 | Cozewith et al. | 526/88 |
| 4,791,180 | 12/1988 | Turner | 526/160 |
| 5,096,867 | 3/1992 | Canich | 502/103 |
| 5,153,157 | 10/1992 | Hlatky et al. | 502/117 |

FOREIGN PATENT DOCUMENTS

| | | |
|---|---|---|
| 019100 | 11/1980 | European Pat. Off. . |
| 127236 | 12/1984 | European Pat. Off. . |
| 0277004 | 3/1988 | European Pat. Off. . |
| 0279153A2 | 8/1988 | European Pat. Off. . |
| 0540180A1 | 5/1993 | European Pat. Off. . |
| 01135804 | 5/1989 | Japan . |
| 1322599 | 7/1973 | United Kingdom . |

OTHER PUBLICATIONS

Abstract of Solution Polymerisation Apparatus for Olefin. SU–147175 (1961).
Abstract CA80(26):147373j Renken, Chem. Ing. Tech. 46(3),113 (Ger) 1974.
Abstract CA79(13):78178Q Renken, et al. Chem. Ing. Tech. 45(12) 854–9 (Ger.) 1973.
Abstract CA78(18):113337u Appln DE 71–2130606 21 Jun. 1971.
Abstract—CA90(14):104405k Crone, et al. Chem. Ing. Tech. 51(1) 42–3 (Ger) 1979.
Abstract—CA102(16):134089u Renken, et al. Dechema Monogr. 94(1932–47 Reaktion S.C.) 1983 313–33.
Abstract CA86(19):139311w Renken, et al. Chem. React. Eng. Proc. Int. Symp. 4th 107–16, 1976.
Soga, et al. "Evaluation of propagation rate Constants . . . " Makrolmol. Chem., Rapid Comm. 10,503–507 (1989).
Lee + Bailey, "Influence of Mixing on the Performance . . . " ALChe Journal vol. 20, No. 1.
Abstract WPI Acc No. 73–03930u/04 for De 2130606.
Meira, et al. J. Macromol. Sci.—Rev. Macromol. Chem. C(20) 2,207–241 (1981).
Soga, et al. "Possibility of Mass Transfer Resistance . . . " Macromolecules 1991, 24, 1699–1700.
Keii, et al. "A Kinetic Argument for a Quasi–Liusng . . . " Makrocmol. Chem., Rapid Comm. 8, 583–587 (1987).
Terano, et al. "Stopped flow Polymerization of Propene . . . " J. Mol. Catal., 56 (1989) 203–210.
Frontini, et al. "Optimal Peroidic Control of a . . . " J. App. Pol. Sci. vol. 33. 2165–2177 (1987).
Schiffino, et al. "A Mechanistic Study of the Methanol . . . " J. Phys. Chem. 1993 97, 6425–6435.
Junghanns, et al. "Polymerisation von Athylen und Propylen . . . " Macromolecular Chem. vol. 58, Dec. 12, 1962, pp. 18–42.
Renken, A. "Use of Peroidic Operation to improve the . . . " Chem. Eng. Sci. 1972, pp. 1925–1932 vol. 27.
Crone + Renken, "Influence of Cyclic Operation on Free . . . " German Chem. Eng. 2 (1979) 337–342.
Reichert, et al., "Polymerization of Ethylene with a Highly Active Ziegler Catalyst in a Plug Flow Reactor", Macromol Symp. 28th 1982 p. 255.
VerStrate, et al., "Near Monodisperse EP Copolymers by direct . . . " Macromolecules 1988, 21, 3360–3371.
Whener, J. F. "Laminar Flow Polymerization of EPOM Polymer" ACS Symposium Series 65 (1978) pp. 140–152.

*Primary Examiner*—David W. Wu
*Attorney, Agent, or Firm*—C. L. Bell

[57] ABSTRACT

This invention relates to a short residence time polymerization reactor operating in periodic mode with multiple catalyst feeds and staged monomer feeds operating to minimize off specification product and optimize and control molecular weight and molecular weight distribution of the polymer produced. This invention contemplates the polymerization of olefins particularly alpha-olefins, particularly ethylene and propylene into homo, co and terpolymers.

26 Claims, 8 Drawing Sheets

PROCESS FOR POLYOLEFIN PRODUCTION USING SHORT RESIDENCE TIME REACTORS

FIELD OF THE INVENTION

This invention relates to a short residence time polymerization reactor(s) operating in periodic mode with single or multiple catalyst feeds and single or multiple staged monomer feeds. Advantages of this invention over existing continuous stirred tank and fluid bed reactors include minimizing off specification products, control of molecular weight and molecular weight distribution of the polymer product, and production of special polymer products.

BACKGROUND OF THE INVENTION

Prior tubular type reactors disclosed in "Polymerization of Ethylene and Propylene to Amorphous Copolymers with Catalyst of Vanadium Oxychloride and Alkylaluminumhalides"; E. Junghanns, A Gumboldt and Gdier, Marcomolecular Chemistry Vol. 58 Dec. 12, 1962 p. 18–42 show the use of a tubular reactor to produce ethylene propylene copolymer in which the compositions vary along the chain length. Specifically, a Ziegler catalyst (vanadium compound and aluminum alkyl) is used in a tubular reactor to produce amorphous ethylene propylene copolymer. It is further disclosed that at the beginning of the tube, ethylene is preferentially polymerized and no additional ethylene monomer mixture is added during polymerization, thus the concentrations of the monomers change in favor of the propylene along the tube. These changes in concentration take place during chain propagation such that copolymer chains are produced which contain more ethylene at one end than at the other end. It is also disclosed that copolymers made in the tube reactor are chemically non-uniform, but fairly uniform with regard to molecular weight distribution.

Another tubular reactor process is disclosed in "Laminar Flow Polymerization of EPDM Polymer" by J. F. Wehner: ACS Symposium Series 65 (1978) p. 140–152. Wehner discloses the results of a computer simulation undertaken to determine the effect of tubular reactor solution process with Ziegler catalyst on molecular weight distribution of the polymer product. The specific polymer simulated was an elastomeric terpolymer of ethylene/propylene/1–4 hexadiene. It is particularly stated that since the monomers have different reactivities, polymer of varying composition will be obtained as the monomers are depleted. However, whether the composition varies intra or intermolecularly is not disclosed.

U.S. Pat. No. 3,681,306 to Wehner discloses a process for producing ethylene/higher-alpha-olefin copolymers having good processability by polymerizing in at least two consecutive reactor stages. According to Wehner this two stage process provides a simple polymerization process that permits tailor making ethylene alpha-olefin copolymers having predetermined properties, particularly those contributing to processability in commercial applications such as cold flow, high green strength and millability. The disclosed preferred process is one tubular reactor followed by one pot reactor. However, Wehner also discloses that one tubular reactor could be used but operated in different reaction conditions to simulate two stages.

U.S. Pat. No. 3,625,658 to Closen discloses a closed circuit tubular reactor apparatus with high recirculation rates of reactants which can be used to make elastomers of ethylene and propylene.

U.S. Pat. No. 4,065,520 to Bailey et at. discloses the use of a batch reactor to make ethylene copolymers, including elastomers, having a broad compositional distribution. Several feed tanks for the reactor are arranged in series with the feed to each being varied to make the desired polymer. The products made have crystalline and semi-crystalline to amorphous regions and gradient changes in between. The catalysts used were vanadium compounds alone or in combination with titanium compounds and were exemplified by vanadium oxytrichloride and diisobutyl aluminum chloride. In all the examples titanium compounds are used. The polymer chains produced have a compositionally dispersed first length and uniform second length.

British Patent No. 1,233,599 is illustrative of a two stage polymerization process typically used to produce polymers of polymodal molecular weight distribution. While copolymers of ethylene are disclosed, the examples and disclosure are directed towards polyethylene homopolymers and crystalline copolymers e.g. 95% ethylene.

U.S. Pat. No. 4,078,133 discloses an ethylene propylene rubber composition having a bimodal distribution prepared by carrying out the polymerization in two separate reactors connected in series.

U.S. Pat. No. 3,681,306 discloses a two stage polymerization process for the preparation of ethylene/propylene co and terpolymers. In one embodiment the first stage is a pipe reactor and the second stage is a back mix pot reactor. The polymerization is carried out so that the average ethylene to alpha-olefin ratio in one stage is at least 1.3 times the average of another stage.

U.S. Pat. No. 4,786,697 to Cozewith et at. discloses a polymodal molecular weight distribution ethylene copolymer comprising at least two modes of differing molecular weight produced utilizing at least two catalyst species in a tubular plug flow reactor. In particular, the Cozewith process is carried out in a mixed free reactor system which is defined to be one in which substantially no mixing occurs between portions of the reactor mixture that contain polymer chains initiated at different times. In addition, the product can be removed at one or more locations. This process produces polymer of a polymodal molecular weight distribution. Alternately, two or more catalysts with different propagation rates can be used. Suitable reactors are disclosed to be continuous flow tubular or stirred batch reactors and multiple monomer feeds and residence times as low as 1 second are also disclosed.

SUMMARY OF THE INVENTION

This invention relates to a short residence time polymerization reactor operating in a semi-continuous pulsating mode with single or multiple catalyst feeds and staged monomer feeds operating to minimize off specification product and optimize and control molecular weight (Mw) and molecular weight distribution of the polymer produced. This invention contemplates the polymerization of olefins particularly alpha-olefins, particularly ethylene, propylene, butene and hexene into homopolymers, copolymers, terpolymers and block copolymers.

BRIEF DESCRIPTION OF THE DRAWINGS

Drawing 1 is a plot of the molecular weight (Mw) vs the residence time (sec) for a computer simulated polymerization (solid line) and for experiments with ethylene polymerization (dots).

Drawing 2 is a schematic drawing of the single stage periodic operated process of this invention.

Drawing 3 is a schematic design drawing of a multi stage periodic operated process of this invention.

Drawing 4 is the schematic design drawing of the experimental apparatus used in the examples to this invention.

Drawing 5 is a plot of the pressure inside the reaction zone used in example 5, showing the pressure fluctuations of the semi-continuous pulsating mode with a residence time of 4 seconds.

Drawing 6 is an FI-TR (Fouier Transform Infrared Spectroscopy) spectra of the copolymers made in example 3 (5 seconds on top, 10 seconds on bottom).

Drawing 7 shows the GPC of the polymer made at 60 secs. residence time in example 4.

DETAILED DESCRIPTION OF PREFERRED EMBODIMENTS

This invention relates to the discovery that operating a short residence time polymerization reactor in a periodically pulsed mode with single or multiple catalyst feeds and single or multiple catalyst activator feeds with optional staged or combined monomer feeds is beneficial. In addition the processes of this invention also provide methods to control molecular weight and molecular weight distribution of the polymer product, minimize off specification product and produce special polymers.

In general, preferred processes of this invention comprise contacting in a semi-continuous pulsating mode: (1) a catalyst component combined with monomer with (2) a catalyst activator combined with the same or different monomer in a reaction zone under polymerization conditions for a period of about 600 seconds or less then stopping the polymerization by quenching or other methods known in the art. Pulsing the two feeds combined with residence times that are roughly equal to the pulse duration is an effective polymerization method for producing polymers having preselected molecular weights (Mw) and compositoion distributions. In preferred embodiments the polymerization yield is increased. In preferred embodiments the ratio of the pulse duration of the monomer/catalyst feeds and the monomer/catalyst activator feeds to the residence time in the reaction zone is about 6:1 to about 0.9:1, preferably about 3:1 to about 0.9:1, even more preferably about 1:1. Pulse is defined to be the selected discrete volume of monomer and catalyst or the selected discrete volume of monomer and catalyst activator. In preferred embodiments the pulse will substantially fill the total reactor volume.

For purposes of this invention the word catalyst refers to compositions that typically require an activator or accelerator to polymerize significant amounts of monomer in a reasonable amount of time. For example in typical Ziegler-Natta catalysts the transition metal "catalysts" and the aluminum alkyl "activators" may or may not polymerize monomer to some degree; however when combined, the aggregate produces an effective polymerization catalyst that polymerizes monomer much faster than either of the individual components alone.

Preferred residence times are up to about 600 seconds, more preferably 0.5 to 600 seconds, more preferably about 2.0 to about 200 seconds, even more preferably 1 to 60 seconds. Prefered residence times for individual catalyst cocatalyst combinations and specific monomers will vary however and the above ranges should be viewed as preferred and not as absolute. For example hafnium cyclopentadienyl transition metal catalysts activated with a non-coordinating anion will have a prefered residence time of about 30 to about 90 seconds more preferably about 60 seconds, while zirconium version of similar catalysts typically will have preferred residence times of 3 to 30 seconds.

The polymerization process is preferably run "semi-continuously," i.e. repeatedly pulsing a discrete amount of the monomer/catalyst and monomer/catalyst activator feeds (MCF and MAF, respectively) into the reaction zone for the short residence time, then stopping the reaction and collecting the polymer product in an assembly line fashion. The polymerization is not considered continuous polymerization because the flow of the MCF and MAF feeds as well as the polymer product is regularly interrupted. Likewise the polymerization is also not considered tubular since the preferred reactors have a ratio of length to diameter (l/d) that is typically 20 or less, even more preferably 1 to 10, whereas tubular reactors typically have l/d ratios of 500 or more. This and the short residence time help minimize the importance of mixing, laminar flow and turbulent flow considerations.

PROCESS

In practicing processes in accordance with the present invention use is preferably made of at least one pipe reactor, thus, in its simplest form such a process would make use of but a single reactor. However, as would readily occur to the artisan having the benefit of the present disclosure, one or more reactors could be used either in parallel for economic reasons or in series with multiple monomer feeds to vary intramolecular composition.

The process of this invention is preferably carried out in a transfer line reactor, but may be carded out in any reactor capable of short residence times and pulsed feed flow as one of ordinary skill in the art will readily appreciate. "Transfer line reactor" is defined as one where a partially activated polymerization mixture, i.e. the catalyst monomer set mixed with the catalyst activator monomer set, spends a short time before it is transferred to a polymerization termination vessel. The volume of the transfer line reactor is calculated to achieve the desired production rate according to the following equation:

$$V_R = 10^6 \times (P/(R_p \times M_o))$$

where:

$V_R$ is the reactor volume (liters)

P is the production rate (metric ton/h)

$R_p$ is the polymerization rate (mol/((l) (h)).)

$M_o$ is the monomer molecular weight (g/mol)

As is known in the art this equation relates the fact that the reactor volume will be small when the polymerization rate is high. Preferred processes of this invention make use of high polymerization rates to achieve desired production rates under short residence times. In a preferred embodiment the small volume reactor is operated in a semi-continuous pulsed manner, with the residence time effectively being controlled by the frequency of the pulses being fed to the reactor.

Figure 2:
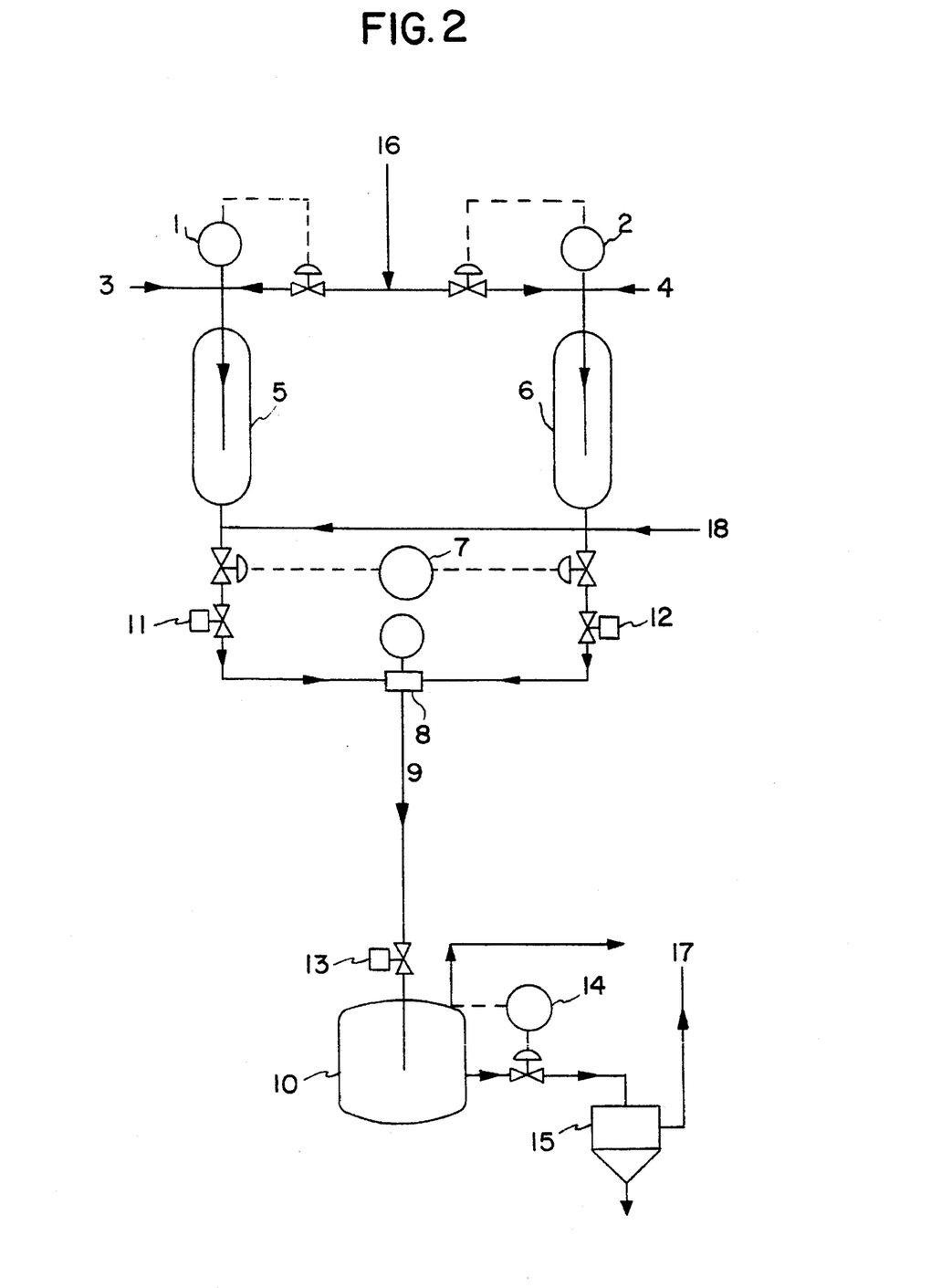
Figure 3:
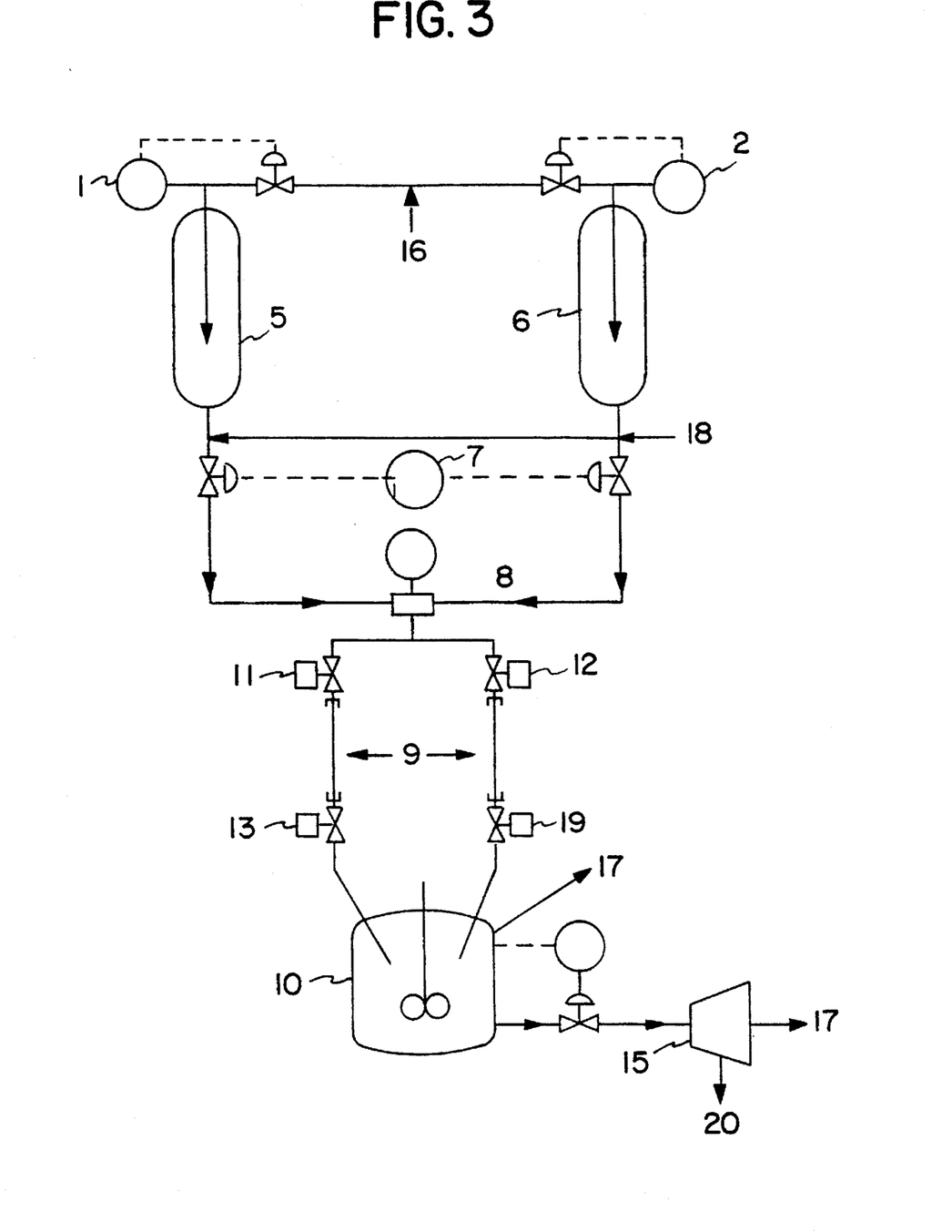

Drawings No 2 and 3 show examples for the process. Monomers (16) and non-activated catalyst (3) and monomers (16) and catalyst activator(4) are fed to the catalyst vessel (5) and activator vessel (6) which are kept at constant pressure through the pressure control loop (pressure indicator control unit)(1,2). The monomer might be sparged or dispersed in the solutions depending whether the vessels are stirred or not. Additional solvent may enter the system (18). The FIC (flow indicator control) Ratio(7) control will feed specified amounts of monomer saturated catalyst and monomer saturated activator solutions to the mixing joint (8) at the entrance of the Transfer Line Reactor (TLR)(9). Polymerization takes place in the TLR and is terminated, preferably quenched, at the exit of the reactor in the termination zone (10). The termination is preferably accomplished by quenching with a polar compound, preferably an alcohol or water solution, although any catalyst killer will suffice. The process can be operated in continuous or in pulsating mode depending on the position of the computer operated valves (11), (12), 13) and (19). In the termination zone, the polymer slurry is transfered to the polymer separator, such as a centrifuge or a filter (15) under level control (LIC) (14) and unused activated catalyst and monomer are recycled to the process (17). Polymer is recovered once it is separated (20).

Selected Mw's or polymodal molecular weight distributions (MWD's) polymer can be produced by using different pulsing frequencies and by using different residence times. In a preferred embodiment the pulse duration is the same as the resience time. Alternately two or more catalysts with different propagation rates can be used or catalyst and activator can be introduced under different pulses frequencies to the reactor or at any point during the reaction process. Likewise, monomer can be introduced at any pulsing frequencies to the reactor.

Thus, it is specifically contemplated by this invention that there maybe one or more monomer, MAF or MCF feeds along the feed system to the reactor, as well as one or more termination vessels at the reactor(s) discharge.

Figure 1:
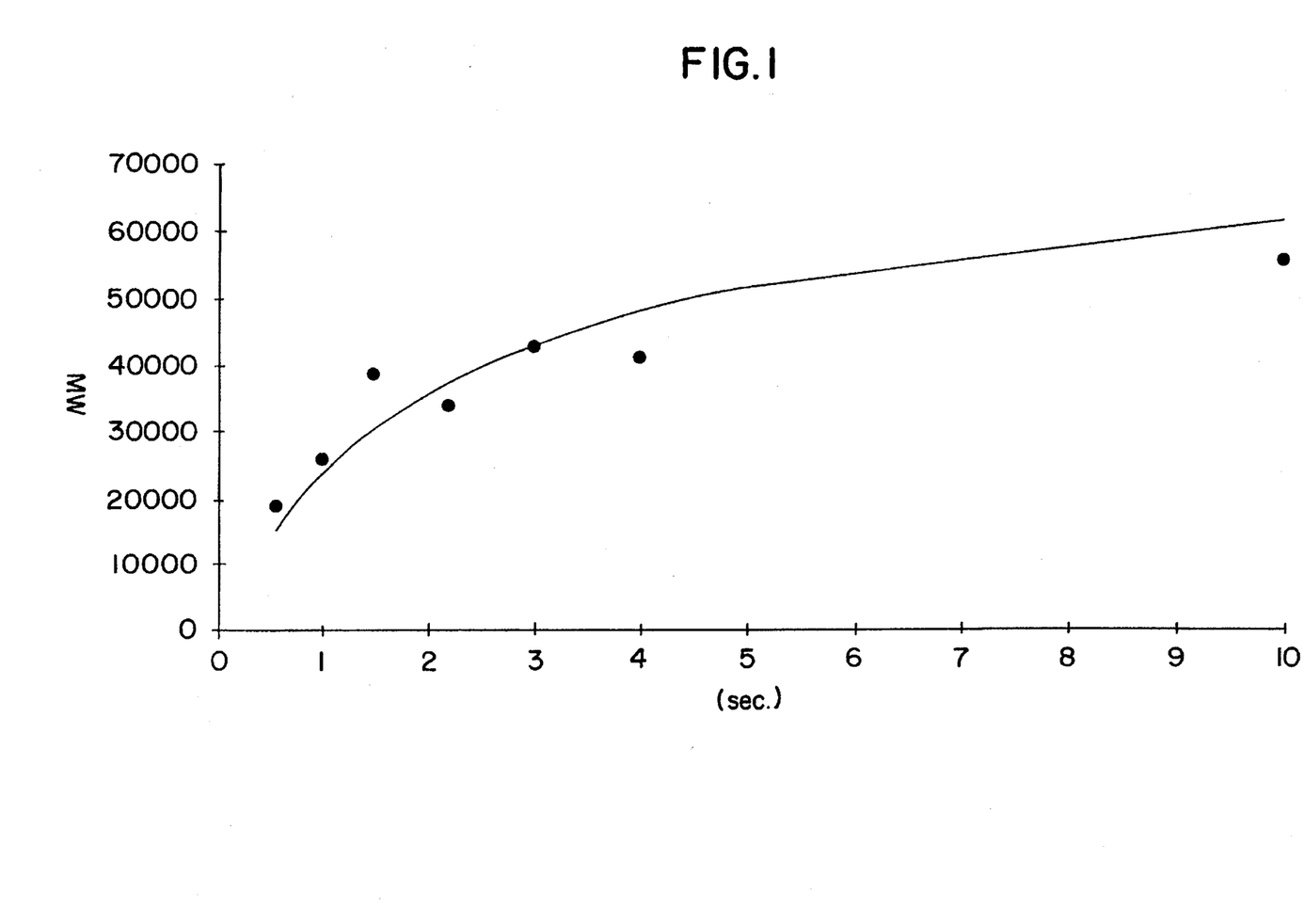

A suitable reactor for use as a transfer line reactor is a small volume pipe reactor. Small volume reactor is defined to be a reactor having a length to diameter ratio of 50:1 or less, preferably 20:1 or less. By pulsing the polymerization mixture through the Transfer line reactor, growing chains for a short period of time before quenching allows control of polymer properties, such as molecular weight and molecular weight distribution. Drawing No 1 shows how the molecular weight can be controlled by the residence time or period of the pulses. The data points represent examples of polyethylene made under a monomer pressure of 20 psig (137.9 kPa) and at 25° C. (Example 1) The solid line represents a prediction from a computer calculation under the reaction conditions calculated using PROCESS® simulation program by Simulation Science Inc. for monomer concentration values.

The desired polymer can be obtained by selectively adding catalyst(s), catalyst activator(s) and reactant(s) during the course of polymerization in a series of Transfer line reactors. Operating in this fashion may be desirable in certain circumstances to control the polymerization rates or polymer composition. However, it may be necessary to add the catalyst and/or activator at the specific residence times or at the inlets of one or more reactors in a series of transfer line reactor operation to meet the requirements that essentially all polymers chains are initiated in such a way that the desired polymer will be produced.

Drawing No 3 shows an example of a multistaged Transfer Line reactor system. Monomers, activator and catalyst are fed to the Catalyst and Cocatalyst vessels which are kept at constant pressure through the pressure control loop (PIC). The monomer might be sparged or dispersed in the solutions depending whether the vessels are stirred or not. The FIC Ratio control will feed specified amounts of monomer saturated catalyst and cocatalyst solutions to the mixing joint (M-1) at the entrance of the more than one Transfer Line reactors. Computer operated valves S-1 through S-4 control the residence time for the polymerization reaction taking place in the small volume Transfer Line reactors. These control valves can be operated at variable frequencies and phases to provide unique polymer properties such as copolymers and block copolymers. At the quencher the polymerization reaction are stopped by an appropriate polar compound, such an alchool or water. Unreacted monomer is separated from the reaction mixture in the quencher. At the exit of the quencher, the polymer is separated from the solvent by means of filtration, or preferably by centrifugation or other means known in the art.

Likewise, polymer can also be drawn off to the quencher/termination area at certain residence times along the reaction to obtain the desired product. Accordingly, the processes in accordance with the present invention contemplate withdrawing polymer fractions from the reactor or tank reactor train at various times or after varying degrees of polymerization have occurred. The effect of this is to selectively control the polymer properties.

MONOMERS

The processes in accordance with the present invention produce homopolymers, copolymers (herein defined to mean polymers of two or more monomers) or block copolymers by polymerization of a reaction mixture comprising one or more catalysts and an unsaturated linear, cyclic, or branched hydrocarbon, preferably an olefin, a mixture of olefins, or a mixture of olefins and diolefins. The reaction mixture may additionally be comprised of an inert carrier. Preferred polymerizable monomers for this invention are C2 to C100 alpha-olefins, diolefins or mixtures thereof. Preferred monomer combinations include ethylene and C3 to C100 alpha-olefins, preferably C3 to C30 alpha-olefins, even more preferably ethylene and propylene, ethylene and butene-1, ethylene and hexene-1, ethylene and octene-1. Likewise additional preferred monomer combinations also include propylene and ethylene, butene, hexene, pentene, cyclopentene, 3,55 trimethylhexene-1 and any other linear, cyclic or branched C4 to C100 olefin, alpha-olefin or diolefin. Other preferred polymers in accordance with the present invention are those comprised of ethylene and propylene or ethylene, propylene and a diene, for example, EPDM and EP rubbers. Typical dienes included in the terpolymer are non-conjugated dienes such as the following non-limiting examples: (a) a straight chain acyclic diene such as 1,4-hexadiene and 1,6 octadiene; (b) branched chain acyclic diene such as 5-methyl-1,4-hexadiene, 3,7-dimethyl, 1,6-octadiene, 3,7-dimethyl-1,7-octadiene and the mixed isomers of dihydromyrcene and dihydroocinene; (c) single ring alicyclicdienes such as 1,4-cyclohexadiene, 1,5-cyclooctadiene and 1,5-cyclododecadiene; and (d) multi-ring alicyclic fused and bridged ring dienes such as tetrahydroindinene, methyltetrahydroindiene, dicyclopentadiene, bicyclo(2,2,1)hepta2,5-diene, alkenyl, alkylidene, cycloalkenyl and cycloalkylidene norbornenes, such as 5-methylene-2-norbornene, 5-ethylidene 2-norbornene, 5-(4-cyclopentenyl)-2-norbornene and 5-cyclohexylidene-2-norbornene 5-cyclohexylidene-2 norbornene.

Of the non-conjugated dienes typically used to prepare these copolymers, dienes containing at least one of the double bonds in a strained ring are preferred. The most preferred diene is 5-ethylidene-2 norbornene. The amount of diene present in the copolymer could be from about 0 to 20 wt %, with 0 to 15 wt. % being preferred. The most preferred range is 8–12 wt %.

CARRIER

The process of this invention may be carried out in solution phase, bulk phase or in slurry. The carrier may be any inert liquid capable of suspending or solvating the polymer. Any known carrier for the reaction mixture that is effective for the purpose can be used in conducting polymerization in accordance with the present invention. For example, suitable carders would be hydrocarbons such as aliphatic, cycloaliphatic and aromatic hydrocarbons or halogenated versions of such hydrocarbons. Preferred carriers include C12 or lower straight chain or branched chain, saturated hydrocarbons, C5 to C9 saturated alicyclic or aromatic hydrocarbons or C2 to C6 halogenated hydrocarbons. Most preferred are C12 or lower, straight chain or branched chain hydrocarbons. Non-limiting, but illustrative example of carriers are butane, pentane, hexane, heptane, cyclopentane, cyclohexane, cycloheptane, methycyclopentane, methylcylcohexane, isooctane, benzene, toluene, xylene, chloroform, chlorobenzene, tetrachloroethylene, dichloroethane and trichloroethane.

The reaction mixture comprising one or more activated catalysts and an olefin, a mixture of olefins, or mixture of olefins and diolefins may also be considered a carrier. Likewise the monomer itself may also be a carrier for both the catalyst components and the polymer product.

CATALYST COMPONENTS

Catalyst systems preferred for use in this invention are those having activities of at least about 150 grams of polymer per gram of catalyst per hour (gm/gm/hr), preferably 500, even more preferably 1000, even more preferabaly 1500, that are comprised of at least two components that polymerize hydrocarbons, preferably olefins, when combined. Examples of such catalysts include well known traditional Ziegler Natta catalysts which are generally comprised of: (a) a compound of a transition metal, i.e, a metal of groups 3 to 11, and (b) an organometal compound of a metal of groups 1, 2, 12, 13 of the Periodic Table as published in *Chemical and Engineering News*, 63(5), 27, 1985. Likewise vanadium catalysts with organo metallic activators are also useful in this invention. However, particularly preferred catalyst systems used in this invention are comprised of a metal compound from group 3, 4, 5, or 6 of the periodic table stabilized by two ligands and an activator comprising an aluminum alkyl or mixtures thereof or the partial hydrolysis product of an aluminum alkyl or mixtures thereof with water, an alumoxane or a non-coordinating anion. A preferred catalyst system within this particularly preferred class is a mono, bis, or tris cyclopentadienyl group 4 transition metal compound combined with an alumoxane or a non-coordinating anion. In particular, this invention contemplates the use of biscyclopentadienyl transition metal coordination compounds and monocyclopentadienyl transition metal coordination compounds which can be activated by either an alumoxane or a noncoordinating anion.

Preferred processes of this invention are practiced with that class of catalyst referred to, disclosed, and described in copending U.S. patent application Ser. Nos. 133,052, now abandoned; 133,480, now abandoned; and 542,236, published respectively as European Patent Applications 277, 003; 277,004; and PCT International Application WO 92/00333 and herein incorporated by reference.

Preferred catalyst systems comprising mono, bis, or tris cyclopentadienyl group 4 transition metal compound combined with an alumoxane or a non-coordinating anion. Catalyst systems used in this invention can be represented by one of the following general formulae:

1. $\{[(A-Cp)MX1+]d\{[B']d-\}$
2. $\{[(A-Cp)MX5L']+\}d\{[B']d-\}$

3.

wherein (A-Cp) is either (Cp) (Cp*) or Cp—A'—Cp*; Cp and Cp* are the same or different cyclopentadienyl rings substituted with from zero to five substituent groups S, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S groups are joined forming a C4 to C20 ring to give a saturated or unsaturated polycyclic cyclopentadienyl ligand;

A' is a bridging group, which group may serve to restrict rotation of the Cp and Cp* rings;

(C5H5-y-xSx) is a cyclopentadienyl ring substituted with from zero to five S radicals;

x is from 1 to 5 denoting the degree of substitution;

M is a group 4 metal, preferably titanium, zirconium or hafnium;

L' is a neutral Lewis base;

X1 is a hydride radical, hydrocarbyl radical, substituted-hydrocarbyl radical, hydrocarbyl-substituted organometalloid radical or halocarbyl-substituted organometalloid radical;

X2 is a hydride radical, hydrocarbyl radical or substituted-hydrocarbyl radical, halocarbyl radical or substituted halocarbyl radical, hydrocarbyl-substituted organometalloid radical or halocarbyl-substituted organometalloid radical, which radical my optionally be covalently bonded to both M and L';

(JS'z-1-y) is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1;

w is an integer from 0 to 3; and

B' is a chemically stable, non-nucleophilic anionic complex having a molecular diameter about or greater than 4 angstroms; and d is an integer representing the charge of B'.

In an alternate form {[B']d-} is replaced by an alumoxane represented by the formula (R—Al—O)n or R(R—Al—O)n'AIR2 where R is a C1–C6 alkyl group such as, for example, methyl, ethyl, propyl, butyl and pentyl, n is an integer of from 3 to 20, and n' is an integer from 1 to 20. Preferably, R is methyl and n and n' are 4–18.

The catalysts are preferably prepared by combining at least two components. The first component is a cyclopentadienyl derivative of a Group 4 metal compound containing at least one ligand which will combine with the second component or at least a portion thereof such as a cation portion there. The second component may be an alumoxane. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent.

The second component may also be an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as a polyhedral boranes, carboranes and metallacarboranes.

The cation portion of the second component may comprise Bronsted acids such as protons or protonated Lewis bases or may comprise reducible Lewis acids such as ferricinum, tropylium, triphenylcarbenium or silver cations.

Suitable non-coordinating anions such as polynuclear boranes, carboranes, metallacarboranes, polyoxooanions and anionic coordination complexes are well described in the chemical literature. Upon combination of the first and second components, the cation of the second component reacts with one of the ligands of the first component, thereby generating an anion pair consisting of a Group 4 metal cation and the aforementioned anion, which anion is compatible with and noncoordinating towards the Group 4 metal cation formed from the first component. The anion of the second compound must be capable of stabilizing the Group 4 metal cation without interfering with the Group 4 metal cation's ability to function as catalyst and must be sufficiently labile to permit displacement by an olefin, diolefin or an acetylenically unsaturated monomer during polymerization.

THE TRANSITION METAL COMPONENT

The Group 4 metal compounds; i.e., titanium, zirconium and hafnium compounds, useful as first compounds in the preparation of the improved catalyst of this invention are cyclopentadienyl derivatives of titanium, zirconium and hafnium. In general, useful complexes may be represented by the following general formulae:

4. $(A-Cp)MX_1X_2$
5. $(A-Cp)ML$
6. $(Cp^*)(CpR)MX_1$ wherein L is an olefin, diolefin or aryne ligand;

$X_1$ and $X_2$ and $X'_1$ and $X'_2$ are independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, or are joined an bound to the metal atom to form a metallacycle ring containing from about 3 to about 20 carbon atoms; and R is a substituent on one of the cyclopentadienyl radicals which is also bonded to the metal atom.

The Group 4 metal compounds useful as the first component in catalyst systems for the production of polyolefins are cyclopentadienyl derivatives of titanium, zirconium or hafnium which compounds are either chiral racemic compounds, or are non-chiral bridged stereorigid compounds composed of two differently substituted non-hydrolizable ligands. Such transition metal compounds are represented by the general formula set forth in the equations above, wherein; M, X1, X2 and L are defined as in the formulae above and A—Cp is Cp—A'—Cp* where Cp and Cp* are each a cyclopentadienyl ligand which are independently unsubstituted or substituted at one or more carbon atoms of the ligands by one or more monovalent or divalent radicals R, and (1) A" is a divalent hydrocarbon or silahydrocarbon radical which structurally bridges together the cyclopentadienyl ring ligands to impart stereorigidity to the Group 4 metal compound such that the Group 4 metal compound is a chiral compound either in its pure L or pure D optical isomer form or a racemic mixture thereof; (2) A' is a divalent hydrocarbon or silahydrocarbon radical which structurally bridges two non-hydrolizable ligands have distinctly different chemical structures; or (3) A—Cp is (Cp) (Cp*) wherein Cp and Cp* are each substituted with at least one substituent sufficiently large enough to restrict rotation of the cyclopentadienyl ligands.

In general, preferred mono(cyclopentadienyl) Group 4 metal compounds for the production of poly-alpha-olefins with enhanced tacticity are bridged species (y=1 in formula 7 or 8). A preferred method of preparing these compounds is by reacting a cyclopentadienyl lithium compound with a dihalo compound whereupon a lithium halide salt is liberated and a monohalo substituent is covalently bound to the cyclopentadiene. The substituted cyclopentadiene is then reacted with a lithium salt of a phosphide, oxide, sulfide, or amide for the sake of illustration, a lithium amide) whereupon the halide is eliminated from the monohalo substituent group, forming thereby a lithium halide salt with the heteroatom group, preferably an amide, covalently bonded to the substituent of the cyclopentadienyl reaction product. The resulting cyclopentadienyl derivative is then reacted with an strong base, preferably an alkyllithium, to remove the labile hydrogen atoms on the heteroatom and on the cyclopentadienyl ring. The cyclopentadienyl dianion is reacted with a Group 4 metal compound, preferably a tetrahalide. This procedure yields the dichloro derivative of a bridged monocyclopentadienyl Group 4 metal complex corresponding to formula 7 or 8 (y=1). The dichloride complex is then converted into the appropriate hydrocarbyl derivative using a Grignard, lithium, sodium, or potassium salt of the hydrocarbyl ligand. The procedure is analogous to that used to derivatize bis(cyclopentadienyl) complexes of the Group 4 elements.

Unbridged species (y=0) can be prepared from a monocyclopentadienyl Group 4 trihalide complex and the lithium salt of a heteroatom moiety (amide, alkoxide, aryloxide, etc.).

THE ACTIVATOR COMPONENT

The alumoxane compounds useful as activators in the polymerization process may be cyclic or linear. Cyclic alumoxanes may be represented by the general formula (R—Al—O)n while linear alumoxanes may be represented by the general formula R(R—Al—O)n'AlR2. In the general formula R is a C1–C6 alkyl group such as, for example, methyl, ethyl, propyl, butyl and pentyl, n is an integer of from 3 to 20, and n' is an integer from 1 to 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate for 6 to 7 moles of aluminum trimethyl. The reaction is evidenced by the evolution of methane. The mole ratio of aluminum in the alumoxane to total metal in the transition metal compounds which can be usefully employed can be in the range of 0.5:1, and 1000:1, and desirably. 1:1 to 100:1. Preferably, the mole ratio will be in the range of 50:1 to 5:1 and most preferably 20:1 to 5:1.

Additional Compounds useful as an activator component in the preparation of the catalyst systems used in the process of this invention comprise a cation, which is a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in copending U.S. patent application Nos. 133,052 and 133,480:1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In general, the activator compounds containing single anionic coordination complexes which are useful in this invention may be represented by the following general formula:

10.

wherein

H is a hydrogen atom;

[L'-H] is a Bronsted acid;

M' is a metal or metalloid;

Q1 to Qn are, independently, hydride radicals, hydrocarbyl and substituted-hydrocarbyl radicals, halocarbyl and substituted-halocarbyl radicals and hydrocarbyl- and halocarbyl-substituted organometalloid radicals, disubstituted pnictogen radicals, substituted chalcogen radical and any one, but not more than one, of Q1 to Qn may be a halogen radical;

m is an integer representing the formal valence charge of M'; and n is the total number of ligands Q.

As indicated above, any metal or metalloid capable of forming an anionic complex which is stable in water may be used or contained in the anion of the second compound. Suitable metals, then include, but are not limited to, aluminum, gold, platinum and the like. Suitable metalloids include, but are not limited to, boron, phosphorous, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

CHOICE OF TRANSITION METAL COMPOUND-ACTIVATOR PAIRS

In general, and while most transition metal components identified above may be combined with most activator components identified above to produce an active olefin components identified above may be combined with most activator components identified above to produce an active olefin polymerization catalyst, it is important for continuity of the polymerization operations that either the metal cation initially formed from the transition metal compound component or a decomposition product thereof be a relatively stable catalyst. It is also important that the anion of the activator compound be chemically stable and bulky. Further, when the cation of the activator component is a Bronsted acid it is important that the acidity of the activator component be sufficient, relative to the transition metal compound component, to facilitate the proton transfer. In general, transition metal compounds in which the non-cyclopentadienyl ligands can be hydrolyzed by aqueous solutions can be considered suitable transition metal compounds for forming the catalysts described herein, because water (the reference Bronsted acid) is a weaker acid than ammonium ions used as the cation component in the preferred ion-exchange reagents. This concept allows one of ordinary skill in the art to choose useful transition metal compound components because stability to water is a basic chemical property easily determined experimentally or by using the chemical literature.

Suitable Ziegler-Natta catalysts that can also be used in this invention are described in "Ziegler-Natta Catalysis and Polymerizations, Boor, Jr. Academic Press New York, 1979 and "Isospecific Polymerizations of Olefins", Y. Kissen, ed. Springer-Verlag, New York 1985.

The catalyst compositions used by the process of the present invention will, preferably, be prepared in a suitable solvent or diluent. Suitable solvents or diluents include any of the solvents known in the prior art to be useful as solvents in the polymerization of olefins, diolefins and acetylenically unsaturated monomers. Suitable solvents, then, include, but are not necessarily limited to, straight and branched-chain hydrocarbons such as isobutane, butane, pentane, hexane, heptane, octane and the like; cyclic and alicyclic hydrocarbons such as cyclohexane, cycloheptane, methylcyclohexane, methylcycloheptane and the like an aromatic and alkyl-substituted aromatic compounds such as benzene, toluene, xylene and the like. Suitable solvents also include liquid olefins which may act as monomers or comonomers including propylene, 1-butene, 1-hexene, 3 methyl-1-pentene, 4-methyl-1-pentene, 1,4-hexadiene, 1-octene, 1-decene and the like. Suitable solvents further include basic solvents which are not generally useful as polymerization solvents when conventional Ziegler-Natta type polymerization catalysts are used such as chlorobenzene.

As before discussed, the active catalyst species of the catalyst systems used by the process of this invention is relatively stable and are not sensitive to the ion equilibrium deactivation as alumoxane cocatalyzed transition metal compound catalyst systems. The particularly preferred catalyst systems used in the process of this invention, which are highly productive, are preferably present in the reaction zone at ratios of transition metal compound to activator of 10:1 to about 1:1, preferably about 3:1 to 1:1.

Although the relationship between active catalyst lifetime and catalyst system compositions is not known at present for any given catalyst, deactivation can be reduced by using the shortest residence time and lowest temperature in the reactor that will produce the desired monomer conversions.

The catalyst components may be prepared by various means. For example the catalyst and cocatalyst are independently pre-exposed to the monomers prior to the reactor. In this case, monomer concentration effects under the short residence time conditions are minimized by maintaining the concentration at thermodynamic equilibrium. The catalyst components are preferably contained in separate vessels with the monomer mixed in prior to introduction to the reactor. Another method of introducing the catalyst components into the reactor is to introduce the catalyst components mixed with monomer separately at different times to the reactor. The catalyst(s) components can also be introduced at any time along the reaction duration, or between reactor interstages.

The temperature of the reaction mixture should also be kept within certain limits. The temperature at the reactor inlet should be high enough to provide complete rapid chain initiation at the start of polymerization reaction. Temperature control of the reaction mixture is complicated somewhat by the fact that the polymerization reaction generates large quantities of heat. This problem is addressed by using several techniques alone or in combination. Prechilled feed to the reactor may be used to absorb all or a portion the heat of polymerization to control reactor temperature. The reactor is operated adiabatically and temperatures are allowed to increase during the course of polymerization.

When an adiabatic reactor operation is used the inlet temperature of the reactor feed could be from about −50° C. to 50° C. The outlet temperature of the reaction mixture could be as high as 150° C. The preferred maximum outlet temperature is less than 100° C. The most preferred is a change in temperature between inlet and outlet is less than about 20° C. In the absence of reactor cooling such as by cooling jacket to remove the heat of polymerization, the temperature of the reaction mixture will generally increase from the reactor inlet to outlet by 15° to 40° C. Having the benefit of the above disclosure will be well within the skill of the art to determine the operating temperature conditions for making copolymer accordance with the present invention. Because of the heat removal and reactor temperature limitations the preferred maximum copolymer concentration at the reactor outlet is 25 weight per 100 weight diluent. The most preferred maximum concentration is 20 weight per 100 weight diluent. There is no lower limit to the concentration due reactor operability, but for economic reasons is preferred to have a copolymer concentration of at least 2 weight per 100 weight. It is most preferred to have a concentration of at least 3 weight per 100 weight.

The rate of flow of the reaction mixture to the reactors should be high enough to provide partial or total filling of the reactor volume. Reactor mixing is accomplished by the fast entrance of the solutions into a small volume, a condition easily accomplished under the short residence time range. For higher residence times, some concentration gradients might develop in the reactor. The development of the this eventual mixing gradient might affect polymer properties and might guide the selection of catalyst productivity and residence times.

It is believed that the residence time of the reaction mixture in the Transfer line reactor can vary over a wide range. The minimum could be as low as 0.5 second, with a preferred minimum about 2.5 seconds, most preferred minimum of about 5 seconds. It is also believed that the maximum can be as high as 1200 seconds with the preferred maximum of about 600 seconds and the most preferred maximum of 900 seconds.

Indeed, it is contemplated in this invention that special polymodal polymers can be made by coupling of the polymerization initiation, propagation and termination at short residence times. For a single catalyst precursor that generates more than one active catalytic species after activation or for a mixture of catalyst types, polymodal polymers can be made by appropriate choice of pulsing frequencies. For flexibility and selecting the product characteristics of particular choice of pulsing frequencies and sequence can be used in preparing a particular product with predetermined specifications. Similarly inlet ports can be provided for the introduction of additional monomer or catalyst streams, if necessary. The properties of the polymer will be modified so long as the polymerization is carried out in this manner. The polymer can be tailored for example, to a polymodal molecular weight distribution, a narrow molecular weight distribution or a defined composition distribution. Similar results are achieved by introducing fresh catalyst components with the additional monomer feed. It will be evident from this disclosure to those skilled in the art that the polymers of this invention can be prepared by blending the products of runs prepared under different conditions or using different catalyst as well. The quencher vessel can be used as polymer blending device. The product of two Transfer Line reactors can be blended to achieve desired product properties.

EXAMPLES

Since the small volume pipe reactor is a preferred reactor system for carrying out processes in accordance with the present invention, the following illustrative description and examples are drawn to that system but will apply other reactor systems as will readily occur to artisans having the benefit of the present disclosure.

Molecular weight (Mw and Mn) were measured by Gel Permeation Chromotography using a Waters 150 gel permeation chromatograph equipped with a differential refractive index (DRI) detector. The numerical analyses were performed using a commercially available standard Gel Permeation Chromotography software package.

Figure 4:
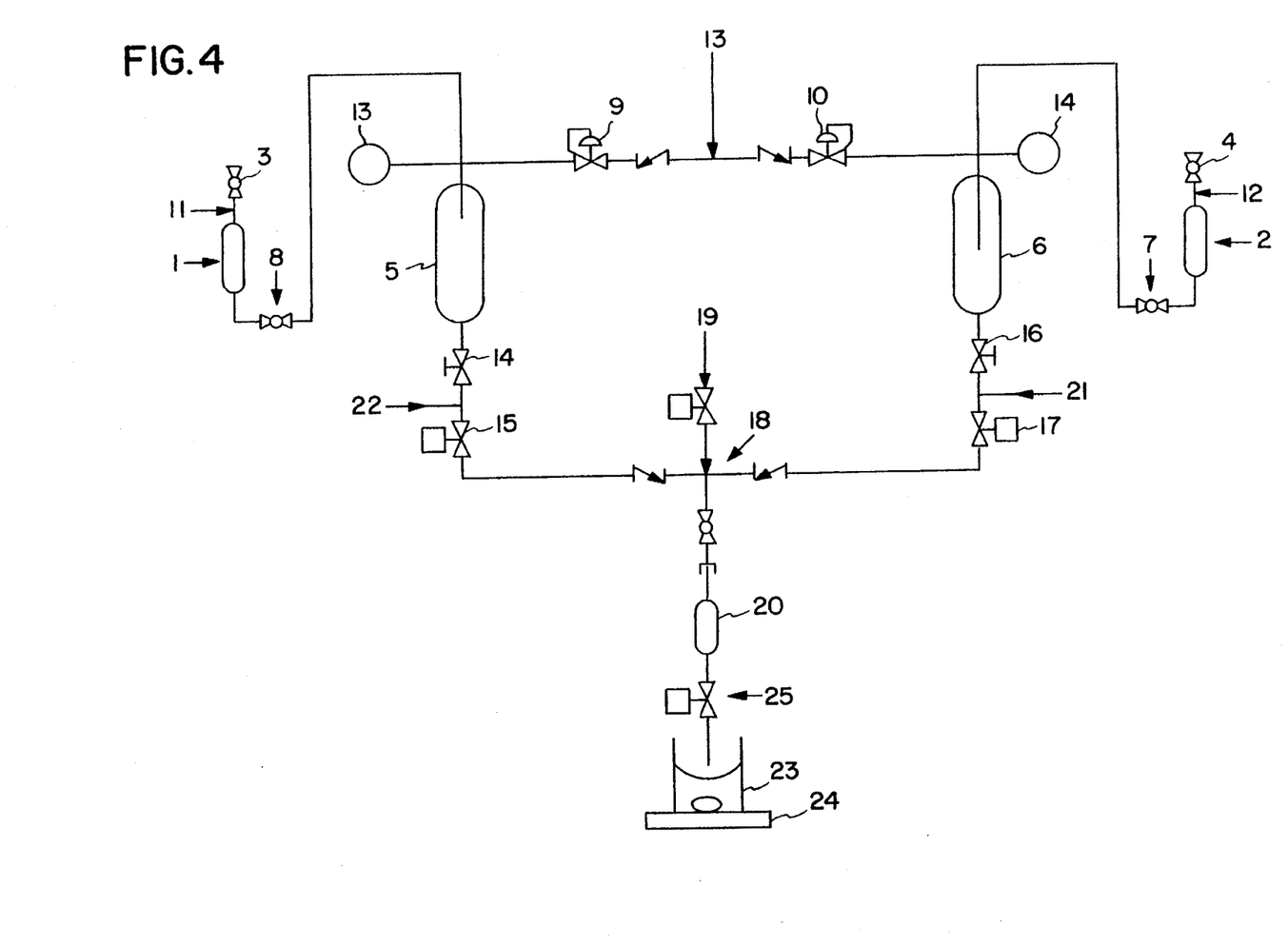

The examples below used the following procedure (the numbers in parenthesis refer to drawing 4): the transition metal compound (catalyst) and the activator were separately weighted and added to distilled toluene in separate vials. Additional Toluene (about 300 c) was transfered to each holding vessel (activator charge vessel (1) and catalyst vessel (2)) through soleniod valves (3,4). Using cannulas, the catalyst (11) and the activator (12) in toluene were transfered to their respective charge vesssels, taking care to avoid cross-contamination of the catalyst with the activator. The charge vessels were then pressured with nitrogen to about 30 psig (206.85 kPa) (13, 14), the bottom valves (7, 8) were opened and the activator and catalyst solutions were then transfered to their respective feed vessels (5,6). The solutions were then saturated with monomer by opening an incoming valve (9, 10) from a pressurized monomer source (13). To ensure saturation conditions the feed vessels were sparged 3 to 5 times by opening and closing the vessel vent. The monomer incoming valve was left open during the polymerization run. Additional solvent was added. (21, 22, 25) (The activator and catalyst feed vessels were kept at constant pressure throughout the polymerization.) A computer (COMPAQ 386® MS-DOS® running the Lab Tech Notebook® software) was then used to automatically open and close a series of valves (15, 17 and 25) to semi-continuously pulse the two feed solutions into the reaction zone (through the mixing joint (18) at the entrance to the reactor (20)) ( at regular intervals which were the same as the as residence times in the data tables). At the end of the residence time the polymer solution was transfered to a continuously stirred 1000 cc receiving flask (23) containing 300 to 400 cc of isopropanol on a magnetic stir plate (24). Polymer was collected, filtered and dried in the oven for about 24 hours and residual isopropanol present after drying was driven off by heat pressing the polymer. The polymerization was typically run for 3 to 20 pulses. Depending on the residence time, either ¼ inch tubing, a 25 cc ⅜" tubing section or a 50 cc whitey cylinder was used as the polymerization reactor. The former was convient for tests in the 0.5 to 2.5 seconds range and the latter was convient for tests for runs in the 2.5 to 300 seconds range.

EXAMPLE 1

In this example, polyethylene was prepared using the procedure and apparatus described above and shown in Drawing No 4 under the following condition.

| | |
|---|---|
| Temperature: | 25° C. |
| Ethylene Pressure: | 20 psig (137.9 kPa) |
| Solvent: | Toluene |
| Solvent Volume: | 800 cc (400 cc on each vessel) |
| Catalyst Conc.: | $3.0 * 10^{-4}$ to $3.0 * 10^{-3}$M |
| Activator Conc.: | $1.0 * 10^{-4}$ to $1.0 * 10^{-3}$M |
| Catalysts: | Z: µ-Dimethylsilyl tetrahydroindenyl dimethyl zirconium |
| | H: bis-cyclopentadienyl dimethyl hafnium |
| | V: Vanadium oxitrichloride |
| Activators: | DEAH: Diethylanilinium(tris)perfluorinated-phenyl, n-butyl-borate |
| | DMA: Dimethylanilinium(tetra)perfluor-inated-phenyl-borate |
| | TEAL: Triethyl Aluminum |

Table 1 shows the results for polymer yield, measured as the accumulated amount from a pulse train, the number average molecular weight, the weight average molecular weight and the polydispersity for a series of runs at variable residence times.

TABLE 1

| Cat | Activator | Reactor Vol. (cc) | Res. Time (s) | Yield (g) | Mn | Mw | MWD | IC/A mg/mg |
|---|---|---|---|---|---|---|---|---|
| Z | DEAH | 12 | 0.55 | 1 | 7,053 | 18,549 | 2.63 | 500/300 |
| Z | DEAH | 11 | 1.0 | 0.5 | 9,275 | 25,692 | 2.77 | 500/300 |
| Z | DEAH | 11 | 1.5 | 0.23 | 12,645 | 38,694 | 3.06 | 450/250 |
| Z | DEAH | 25 | 2.2 | 1.3 | 16,321 | 33,948 | 2.08 | 420/200 |
| Z | DEAH | 25 | 3 | 0.6 | 19,318 | 42,500 | 2.2 | 400/200 |
| Z | DEAH | 12 | 4 | 1.6 | 21,177 | 41,083 | 1.94 | 500/300 |
| Z | DEAH | 25 | 10 | 0.7 | 27,134 | 55,625 | 2.05 | 300/200 |
| Z | DMA | 50 | 10 | 0.8 | 24,989 | 124,69S | 4.15 | 200/100 |
| Z | DMA | 50 | 60 | 0.5 | 80,075 | 289,872 | 3.62 | 60/30 |
| H | DMA | 50 | 120 | 0.3 | 94,829 | 332,850 | 3.51 | 120/60 |
| H | DMA | 50 | 300 | 0.2 | 88,278 | 422,852 | 4.79 | 120/60 |
| V | TEAL | 50 | 5 | 0.042 | 11,266 | 371,665 | 32.99 | 210/38 |
| V | TEAL | 50 | 10 | 0.063 | 20,482 | 658,291 | 32.14 | 210/38 |

MWD = molecular weight distribution = Mw/Mn
IC = catalyst
A = Activator

EXAMPLE 2

In this example, polypropylene was prepared using the procedure and apparatus described above and shown in Drawing No 4 under the following conditions:

| | |
|---|---|
| Temperature: | 25° C. |
| Propylene Pressure: | 20 psig (137.9 kPa) |
| Solvent: | Toluene |
| Solvent Volume: | 600 cc (300 cc on each vessel) |
| Catalyst Conc.: | $1.0 * 10^{-3}$M |
| Activator Conc.: | $0.3 * 10^{-3}$M |
| Catalysts: | Z: µ-Dimethylsilyl tetrahydroindenyl dimethyl zirconium |

-continued

| | |
|---|---|
| Activators: | DEAH: Diethylanilinium(tris)perfluorinated-phenyl, n-butyl-borate |
| Reactor Volume: | 50 cc |

TABLE 2 shows the results for polymer yield, measured as the accumulated amount from a pulse train, the number average molecular weight, the weight average molecular weight and the polydispersity for a series of runs at variable residence times.

TABLE 2

| Residence time (sec) | Yield (g) | Mn | Mw | MWD | Number of pulses | Activator (mg) |
|---|---|---|---|---|---|---|
| 2.5 | 3.24 | 7,645 | 13,990 | 1.83 | 6 | 48 |
| 2.86 | 3.33 | 7,390 | 13,967 | 1.89 | 7 | 58 |
| 3.3 | 3.4 | 6,317 | 11,939 | 1.89 | 6 | 74 |
| 4 | 2.89 | 7,377 | 13,795 | 1.87 | 6 | 67 |
| 6.7 | 4.11 | 6,139 | 12,032 | 1.96 | 6 | 41 |
| 10 | 2.2 | 5,915 | 10,765 | 1.82 | 6 | 55 |
| 20 | 4.4 | 5,941 | 12,536 | 2.11 | 6 | 64 |

It was also noted that the polymer molecular weight was sensitive to the concentration of the activated catalyst. As catalyst concentration increased, Mn decreased. This catalyst concentration effect is usually observed in "living" polymerization systems in which termination reactions are negligable. Here the observation of this trend could indicate changes of monomer concentration and polymerization temperature during the pulses. The temperature changes, however, lowers the molecular weight at the high residence time range. In contrast Mn seemed to vary linearly with increasing monomer concentration. Likewise MWD was found to be more sensitive to termination rates of the catalysts and thus varied with residence time.

EXAMPLE 3

In this example, ethylene-propylene copolymers was prepared using the procedure and apparatus described above and shown in Drawing No 4 under the following conditions:

| | |
|---|---|
| Temperature: | 25° C. |
| Ethylene Pressure: | 20 psig in the catalyst vessel (137.9 kpa) |
| Propylene Pressure: | 20 psig in the activator vessel (137.9 kPa) |
| Solvent: | Toluene |
| Solvent Volume: | 600 cc (300 cc on each vessel) |
| Catalyst Conc.: | $5.0 * 10^{-3}$M |
| Activator Conc.: | $2.5 * 10^{-3}$M |
| Catalysts: | Z: μ-Dimethylsilyl tetrahydroindenyl dimethyl zirconium |
| Activators: | DEAH: Diethylanilinium(tris)perfluorinated-phenyl, n-butyl-borate |
| Reactor Volume: | 50 cc |

Figure 6A:
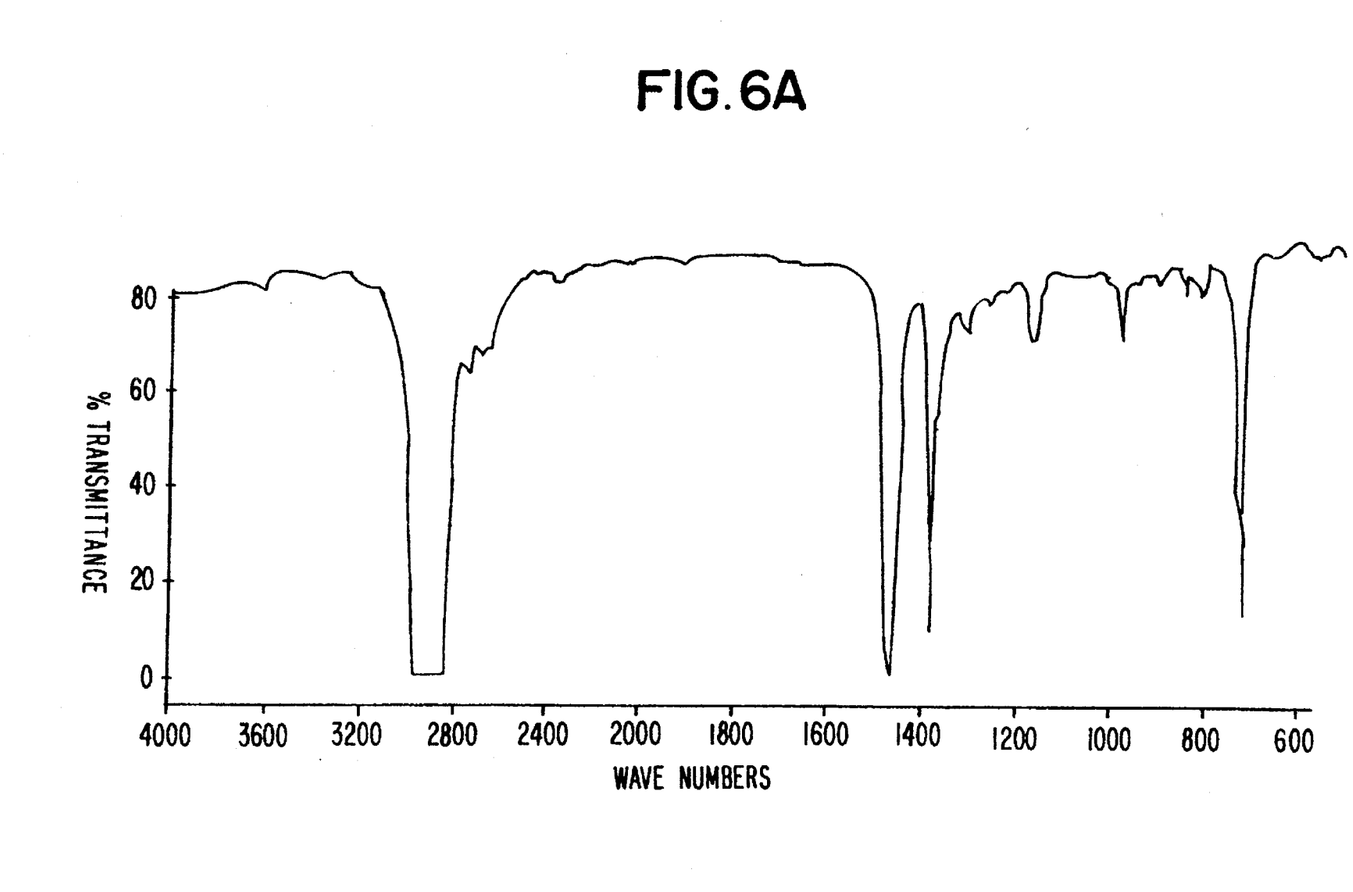
Figure 6B:
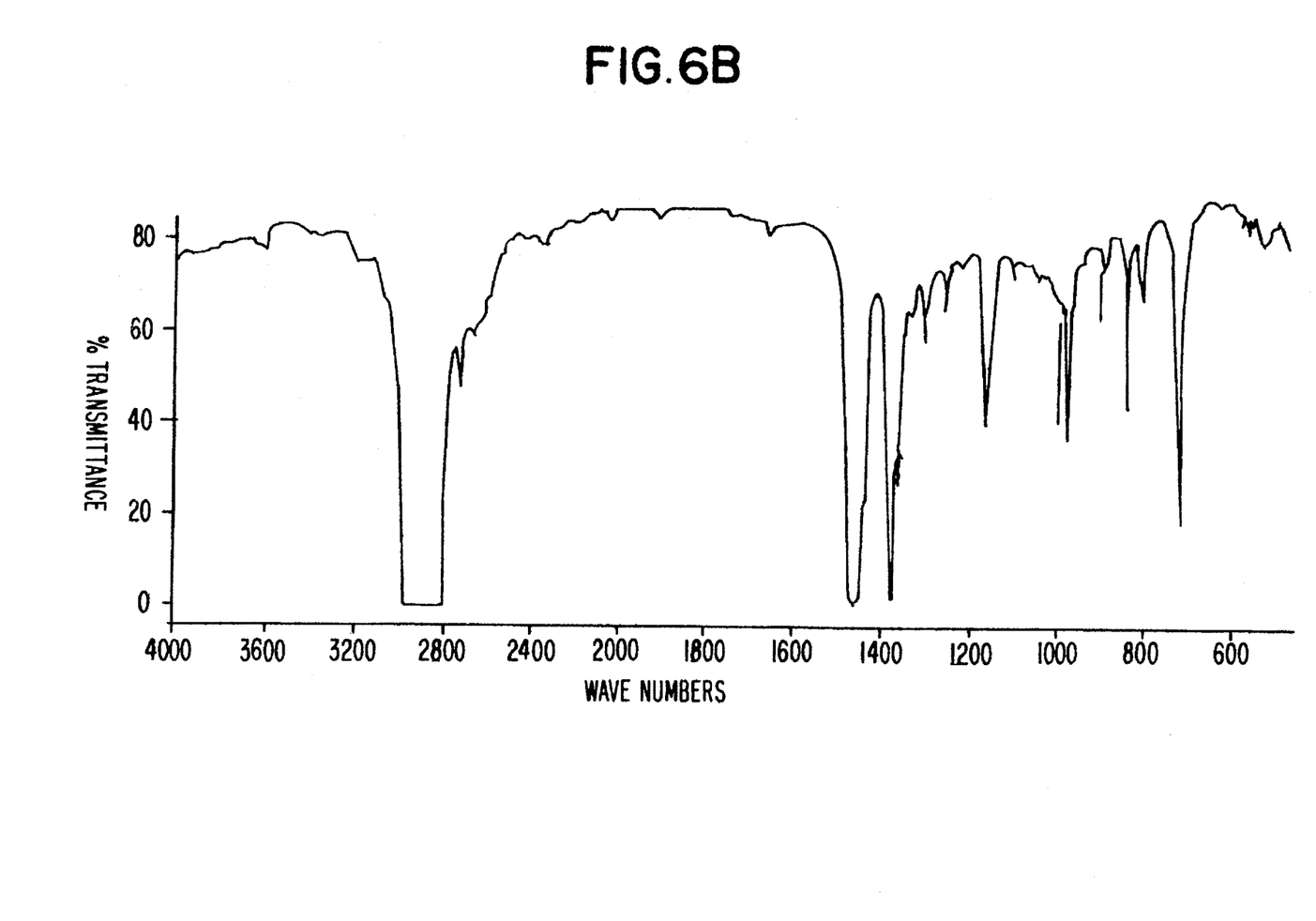

Drawing 6 shows the FT-IR of the copolymers made at 5 and 10 seconds residence. The peaks at 720 cm$^{-1}$ and 1150 cm$^{-1}$ show the presence of copolymers in the sample. The Ethylene content was 50.1% for the 5 sec. sample, and 38% for the 10 sec. sample.

EXAMPLE 4

In this example, bimodal polyethylene was prepared using the procedure and apparatus described above and shown in Drawing No 4 under the following conditions:

| | |
|---|---|
| Temperature: | 25° C. |
| Ethylene Pressure: | 20 psig in the catalyst vessel (137.9 kPa) |
| Solvent: | Toluene |
| Solvent Volume: | 600 cc (300 cc on each vessel) |
| Catalyst Conc.: | $3.0 * 10^{-3}$M |
| Activator Conc.: | $7.0 * 10^{-4}$M |
| Catalysts: | HZ: Bis-cyclopentadienyl dimethyl hafnium doped with 0.1% of Bis-cyclopentadienyl dimethyl zirconium |
| Activators: | DEAH: Diethylanilinium(tris)perfluorinated-phenyl, n-butyl-borate |
| Reactor Volume: | 25 cc |

Figure 7:
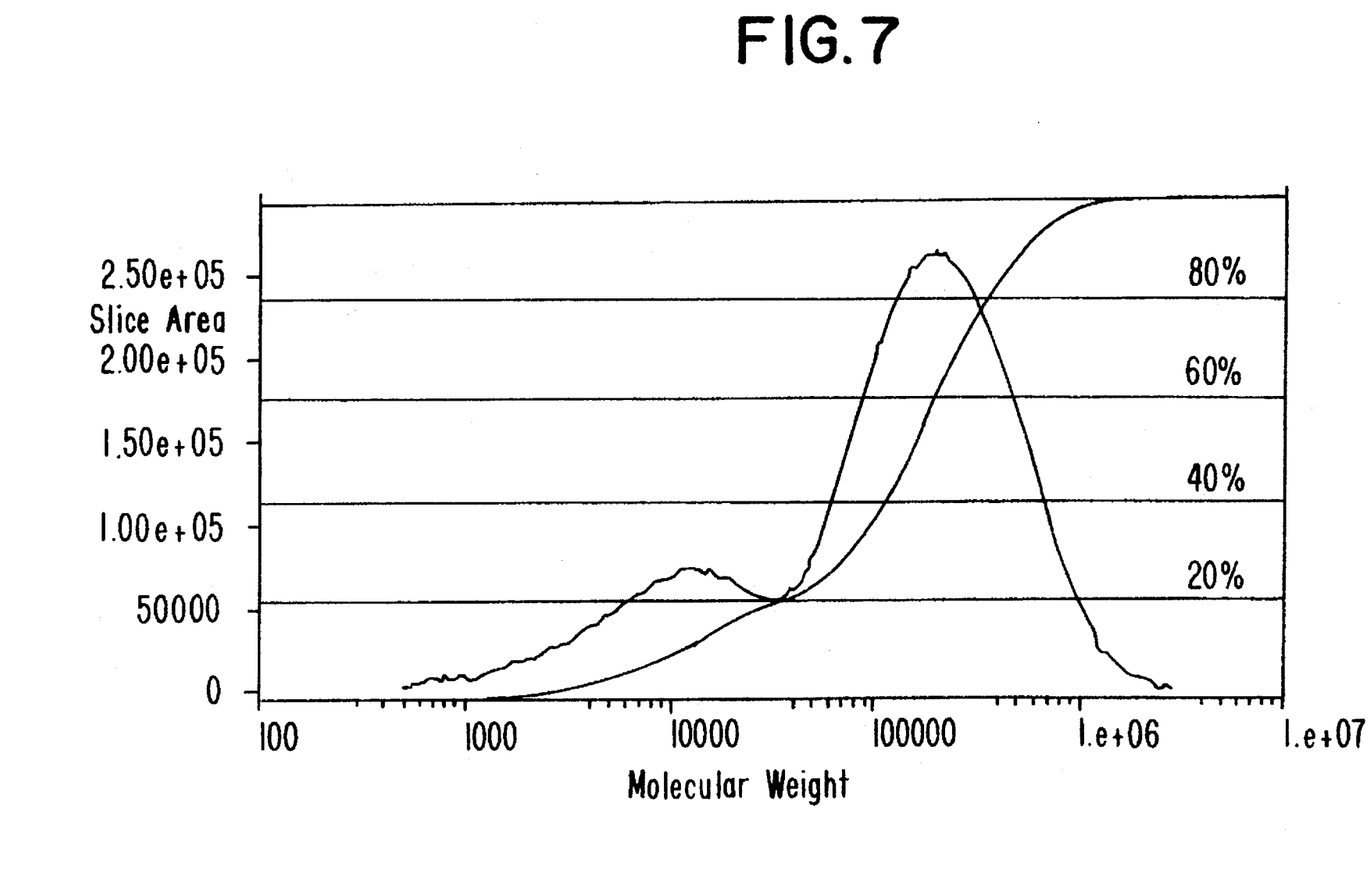

Drawing 7 shows the GPC of the polymer made at 60 secs. residence time (and pulsed 12 times). The apperance of the two modes is related to the relative rates of activation of the transition metal compound catalyst in presence of the monomer, as conducted in the present invention. The polymer had an Mn of 24,994, an Mw of 232,779 and a molecular weight distribution (MWD) of 9.3

EXAMPLE 5

In this example, polypropylene was prepared with the procedure and apparatus described above and shown in Drawing No 4 under the following conditions:

| | |
|---|---|
| Temperature: | 26° C. |
| Propylene Pressure: | 20 psig in the activator vessel (137.9 kPa) |
| Solvent: | Toluene |
| Solvent Volume: | 1400 cc (700 cc on each vessel) |
| Catalyst Conc.: | $3.0 * 10^{-3}$M |
| Activator Conc.: | $7.0 * 10^{-4}$M |
| Catalysts: | Z: μ-Dimethylsilyl tetrahydroindenyl dimethyl zirconium |
| Activators: | DEAH: Diethylanilinium(tris)perfluorinated-phenyl, n-butyl-borate |
| Reactor Volume: | 25 cc |

Figure 5:
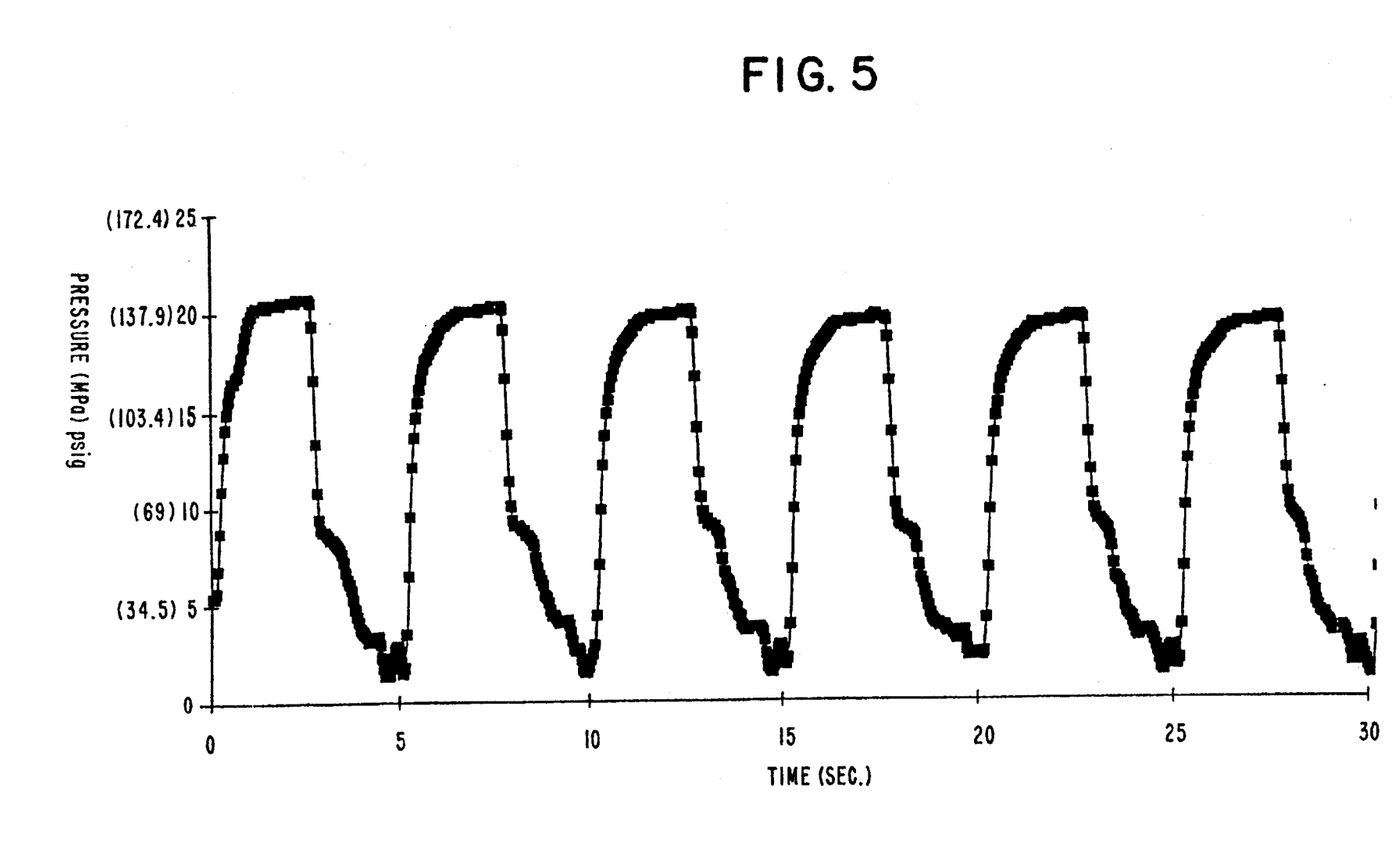

Drawing Number 5 shows the reactor pressure for a residence time of 4 seconds. Under the pulsating operation, the reactor pressure was increased from 0 psig (0 kPa) to the catalyst and activator vessels' pressure of 20 psig (137.9 kPa) during the 4 seconds residence time. During the off-cycle, the reactor was completely depressurized.

EXAMPLE 6

In this example, linear low polyethylene was prepared using the procedure and apparatus described above and shown in Drawing No 4 under the following conditions:

| | |
|---|---|
| Temperature: | 25° C. |
| Ethylene Pressure: | 20 psig (137.9 kPa) |
| Hexene-1: | 10 cc ( 5 cc on each vessel) |
| Solvent: | Toluene |
| Solvent Volume: | 1400 cc (700 cc on each vessel) |
| Catalyst Concen.: | $5.0 * 10^{-3}$M |
| Acitvator | $2.0 * 10^{-3}$M |

-continued

Concen.:
Catalyst: Z: µ-Dimethylsilyl tetrahydroindenyl dimethyl zirconium
Activators: DEAH: Diethylanilinium(tris)perfluorinated-phenyl, n-butyl-borate
Reactor Volume: 25 cc Table 3 shows the results for % comonomer (by weight), the melting point, the polymer density and the Melt Index for a series of runs at vaiable residence times.

TABLE 3

| Res. Time (sec.) | Comonomer (% wt) | Tm (°C.) | MI* (g/10 min.) | Density** (g/cc) |
|---|---|---|---|---|
| 2.5 | 5.3 | 106.1 | 5.3 | 0.911 |
| 5.0 | 6.0 |  | 2.4 | 0.902 |
| 10.0 | 6.3 | 106.9 | 1.9 | 0.905 |

*ASTM D 1238, condition E
**ASTM D 792 or 1501

As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A polymerization process comprising:
   contacting in a semi-continuous pulsating manner having a pulse duration of between 0.5 second and 600 seconds, a first mixture of monomer and catalyst with a second mixture of monomer and catalyst activator in a polymerization zone having a ratio of length to diameter of 50:1 or less and thereafter quenching the polymerization after said pulse duration.

2. The process of claim 1 wherein the polymerization zone is a reactor having a ratio of length to diameter of about 20 or less.

3. The process of claim 1 wherein the two mixtures are pulsed into the reaction zone at intervals of 100 seconds or less.

4. The process of claim 3 wherein the two mixtures are pulsed into the reaction zone at different frequencies.

5. The process of claim 1 wherein the monomers are the same or different olefin monomers.

6. The process of claim 1 wherein the monomers present in the mixtures are independently one or more linear, branched or cyclic unsaturated hydrocarbons.

7. The process of claim 1 wherein the monomers present in the mixtures are independently one or more $C_1$ to $C_{40}$ linear, branched or cyclic alpha olefins.

8. The process of claim 1 wherein the monomers are ethylene and/or propylene.

9. The process of claim 8 wherein the monomers further comprise diene.

10. The process of claim 1 wherein the combined catalyst and activator have a reactivity of at least about 150 g/gm/hr.

11. The process of claim 1 wherein the combined catalyst and activator have a reactivity of at least about 500 g/gm/hr.

12. The process of claim 1 wherein the combined catalyst and activator have a reactivity of at least about 1000 g/gm/hr.

13. The process of claim 1 wherein the combined catalyst and activator have a reactivity of at least about 1500 g/gm/hr.

14. The process of claim 1 wherein the polymerization is quenched with water or alcohol.

15. The process of claim 1 wherein the catalyst and the monomer are present in an inert carrier.

16. The process of claim 1 wherein the two mixtures are pulsed into the polymerization zone at intervals of 120 seconds or less.

17. The process of claim 1 wherein the two mixtures are pulsed into the polymerization zone at intervals of 60 seconds or less.

18. The process of claim 1 wherein the two mixtures are pulsed into the polymerization zone at intervals of 30 seconds or less.

19. The process of claim 1 wherein the two mixtures are pulsed into the polymerization reactor at intervals of about 0.5 to about 60 seconds and the combined catalyst and activator have a reactivity of at least about 500 g/gin/hr.

20. The process of claim 1 wherein the catalyst comprises bis-cyclopentadienyl dimethyl hafnium and the activator is Diethylanilinium(tris)perfluorinated-phenyl-n-butyl-borate.

21. The process of claim 1 wherein the catalyst comprises a hafnium compound and the activator is Diethylanilinium-(tris)perfluorinated-phenyl, n-butyl-borate.

22. The process of claim 1 wherein the catalyst is µ-dimethylsilyl tetrahydroindenyl dimethyl zirconium and the activator is methylalumoxane, dimethylanilinium(tetra)perfluorinated-phenyl-borate or diethylanilinium(tris)perfluorinated-phenyl, n-butyl-borate.

23. The process of claim 1 wherein the catalyst is vanadium oxitrichloride and the activator is triethyl aluminum.

24. A method for the polymerization of olefins comprising:
   semi-continuously pulsing a first composition comprising olefin monomer and a mono, bis or tris cyclopentadienyl group 4 transition metal compound at intervals of 0.5 to 600 seconds,
   semi-continuously pulsing a second composition comprising olefin monomer and an alumoxane and/or a non-coordinating anion at intervals of 0.5 to 600 seconds,
   into a polymerization zone having a ratio of length to diameter of 50:1 or less under polymerization conditions for a residence time of 0.5 to 600 seconds, and
   stopping the polymerization reaction after the residence time.

25. A polymerization process comprising:
   contacting in a semi-continuous pulsating manner having a pulse duration between 0.5 and 600 seconds, a first mixture of monomer and catalyst with a second mixture of monomer and catalyst activator in a polymerization zone having a ratio of length to diameter of 50:1 or less.

26. A polymerization process comprising:
   regularly repeatedly introducing pulses of a catalyst/monomer mixture and pulses of a monomer/catalyst activator mixture into a reactor having a length to diameter ratio of 50:1 or less and optionally thereafter quenching the polymerization after the pulses of catalyst/monomer mixture and the pulses of monomer/catalyst activator are reacted for 0.5 seconds to 600 seconds.

* * * * *